(12) United States Patent
Mermoud et al.

(10) Patent No.: US 11,063,836 B2
(45) Date of Patent: Jul. 13, 2021

(54) MIXING RULE-BASED AND MACHINE LEARNING-BASED INDICATORS IN NETWORK ASSURANCE SYSTEMS

(71) Applicant: Cisco Technology, inc., San Jose, CA (US)

(72) Inventors: Grégory Mermoud, Veyras (CH); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 1123 days.

(21) Appl. No.: 15/464,526

(22) Filed: Mar. 21, 2017

(65) Prior Publication Data

US 2018/0278486 A1 Sep. 27, 2018

(51) Int. Cl.
*H04L 12/24* (2006.01)
*G06N 5/04* (2006.01)
*G06N 20/00* (2019.01)

(52) U.S. Cl.
CPC ............ *H04L 41/16* (2013.01); *G06N 5/046* (2013.01); *G06N 20/00* (2019.01); *H04L 41/147* (2013.01); *H04L 41/5009* (2013.01); *H04L 41/5019* (2013.01)

(58) Field of Classification Search
CPC ...................................................... H04L 41/16
USPC ........................................................... 706/12
See application file for complete search history.

(56) References Cited

U.S. PATENT DOCUMENTS

| | | | |
|---|---|---|---|
| 8,385,632 B2* | 2/2013 | Porikli | G06K 9/6269 382/159 |
| 9,294,497 B1 | 3/2016 | Ben-Or et al. | |
| 2014/0310808 A1 | 10/2014 | Yao et al. | |
| 2015/0333992 A1* | 11/2015 | Vasseur | H04L 12/4641 370/252 |
| 2016/0191348 A1 | 6/2016 | Lee et al. | |
| 2016/0291552 A1 | 10/2016 | Pal et al. | |
| 2016/0359686 A1* | 12/2016 | Parandehgheibi | G06F 16/235 |
| 2017/0019315 A1* | 1/2017 | Tapia | G06N 20/00 |
| 2017/0279835 A1* | 9/2017 | Di Pietro | H04L 43/024 |
| 2017/0279836 A1* | 9/2017 | Vasseur | H04L 63/1425 |

(Continued)

FOREIGN PATENT DOCUMENTS

CN 102724119 A 10/2012

OTHER PUBLICATIONS

Johnson, et al., "Mixing Domain Rules with Machine Learning for Radiology Text Classification", HI-KDD'14, 8 pages, 2014, ACM.

(Continued)

*Primary Examiner* — Hien D Khuu
(74) *Attorney, Agent, or Firm* — Behmke Innovation Group LLC; Kenneth J. Heywood; Jonathon P. Western

(57) ABSTRACT

In one embodiment, a device in a network receives data regarding a plurality of predefined health status rules that evaluate one or more observed conditions of the network. The device, using the data regarding the plurality of health status rules for the network, trains a machine learning-based classifier to generate predictions regarding outputs of the health status rules. The device adjusts the machine learning-based classifier based on feedback associated with the generated predictions. The device provides an indication of one or more of the predictions regarding the outputs of the health status rules to a user interface.

5 Claims, 6 Drawing Sheets

(56) References Cited

U.S. PATENT DOCUMENTS

| | | | | |
|---|---|---|---|---|
| 2018/0150758 A1* | 5/2018 | Niininen | ................ | G06N 20/00 |
| 2018/0234302 A1* | 8/2018 | James | .................... | G06N 20/00 |
| 2019/0121350 A1* | 4/2019 | Celia | ....................... | H04L 67/12 |
| 2021/0056487 A1* | 2/2021 | Boyle | ................... | H04W 24/10 |

OTHER PUBLICATIONS

Villena-Román, et al., "Hybrid Approach Combining Machine Learning and a Rule-Based Expert System for Text Categorization", Proceedings of the Twenty-Fourth International Florida Artificial Intelligence Research Society Conference, 6 pages, 2011, Association for the Advancement of Artificial Intelligence.

* cited by examiner

MIXING RULE-BASED AND MACHINE LEARNING-BASED INDICATORS IN NETWORK ASSURANCE SYSTEMS

TECHNICAL FIELD

The present disclosure relates generally to computer networks, and, more particularly, to network assurance systems that mix rule-based and machine learning-based indicators.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
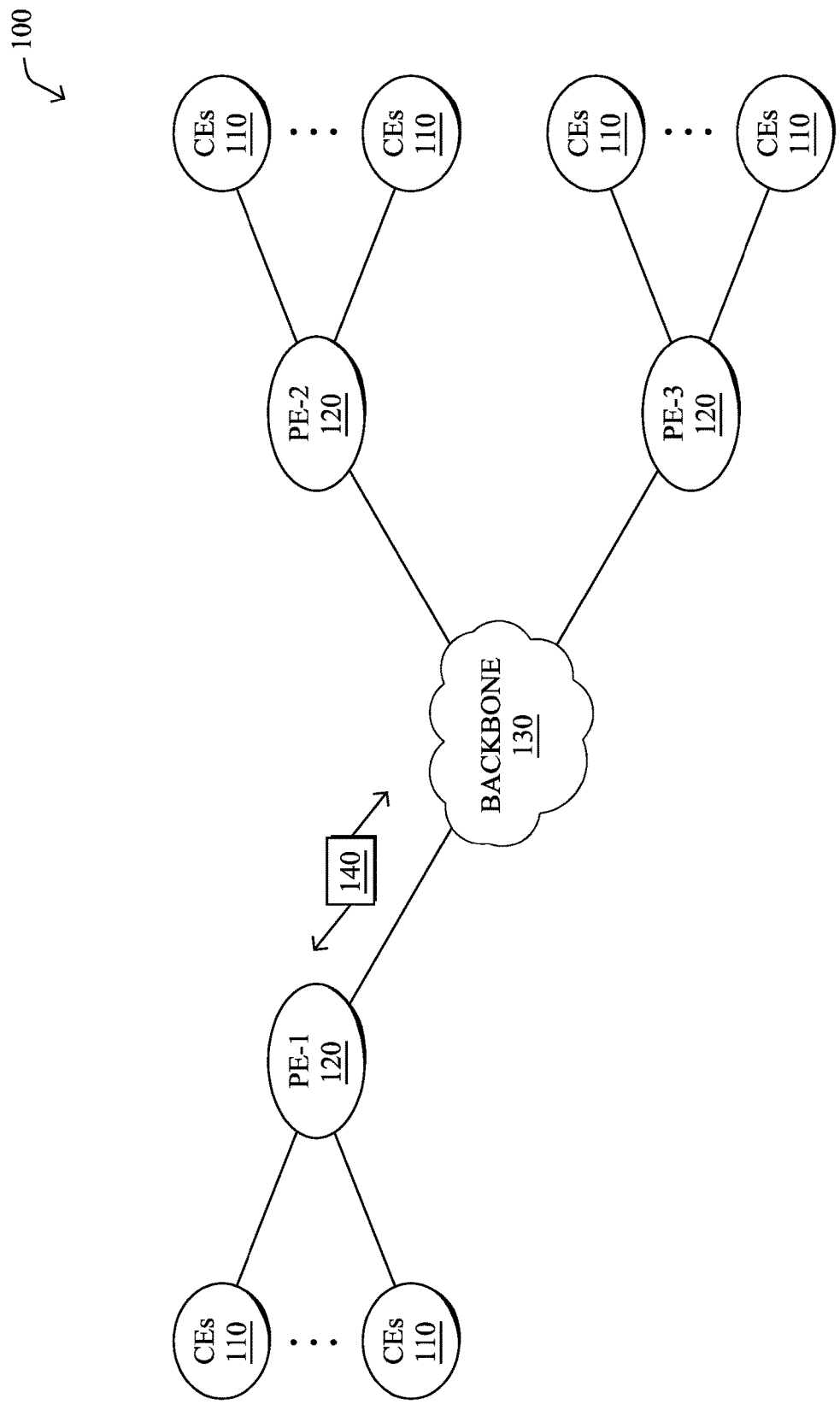
FIGS. 1A-1B illustrate an example communication network.

According to one or more embodiments of the disclosure, a device in a network receives data regarding a plurality of predefined health status rules that evaluate one or more observed conditions of the network. The device, using the data regarding the plurality of health status rules for the network, trains a machine learning-based classifier to generate predictions regarding outputs of the health status rules. The device adjusts the machine learning-based classifier based on feedback associated with the generated predictions. The device provides an indication of one or more of the predictions regarding the outputs of the health status rules to a user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
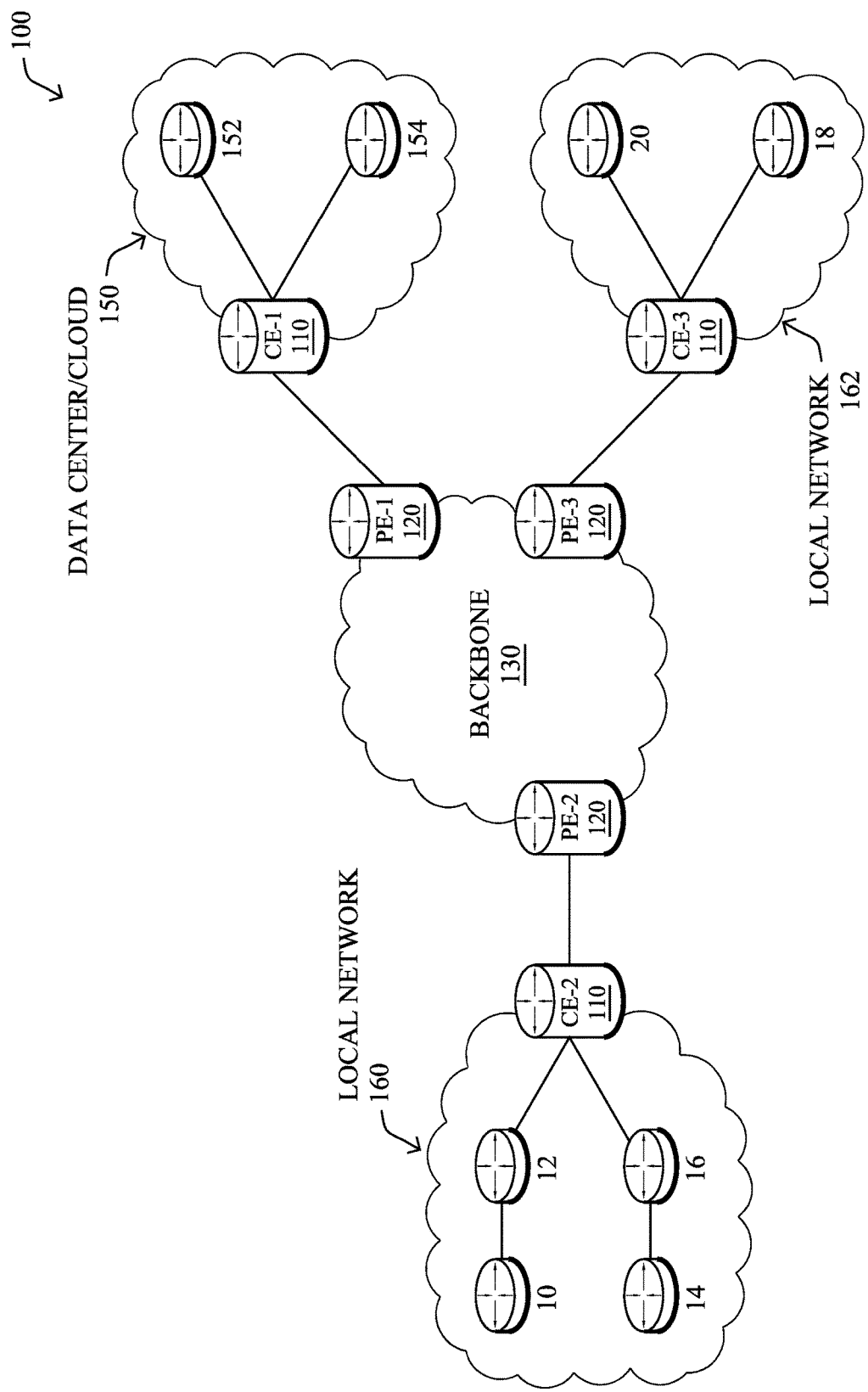

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
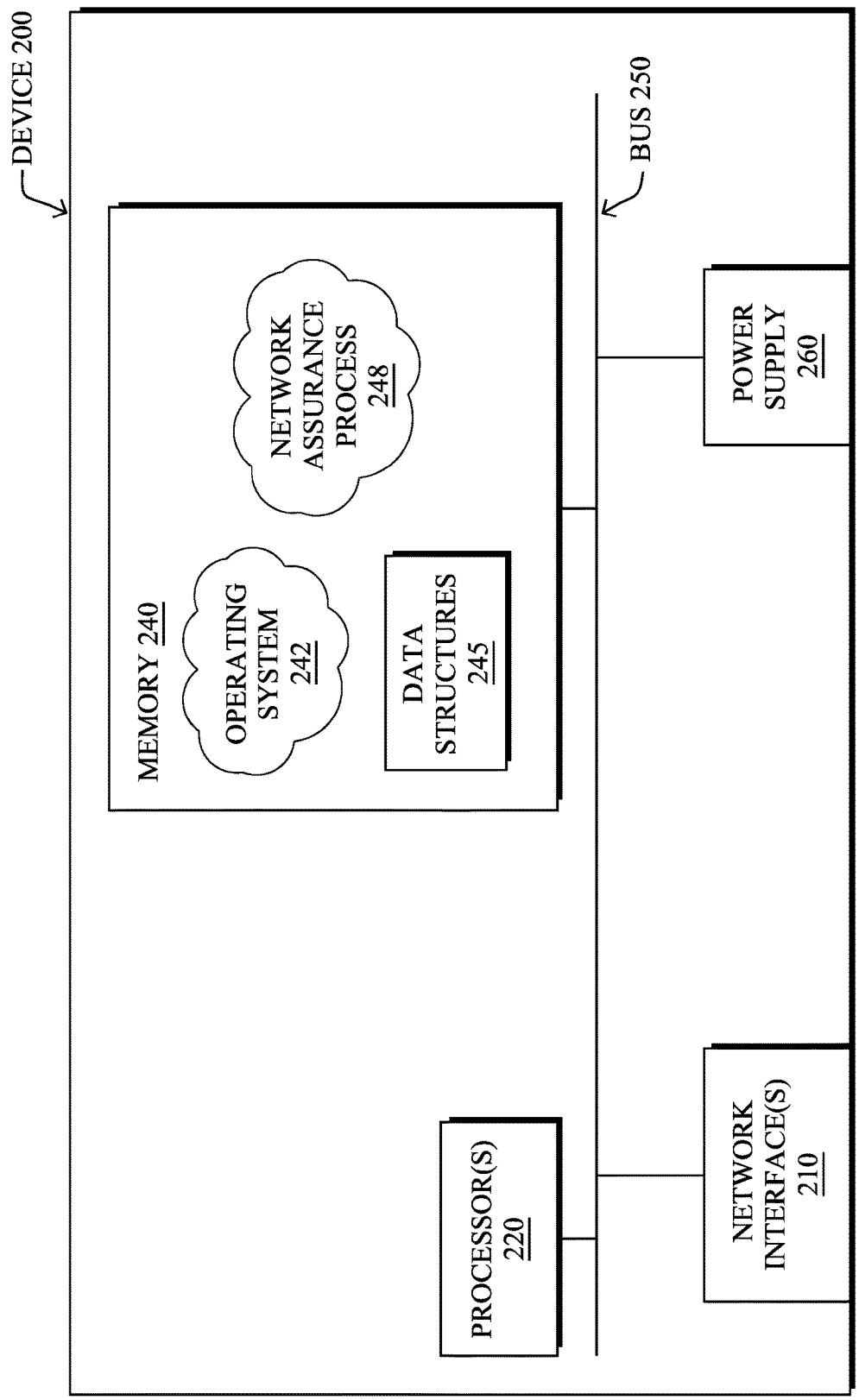
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
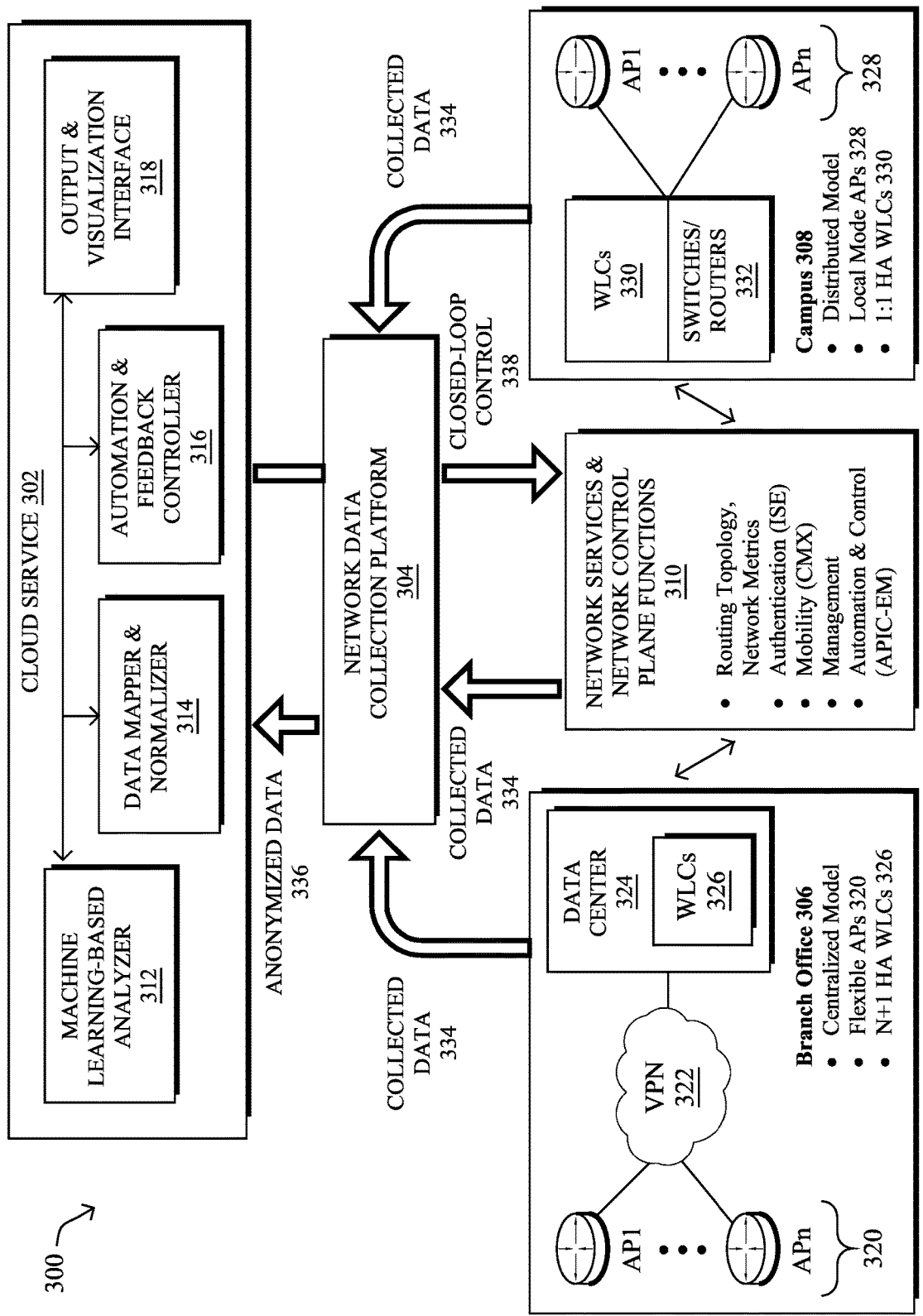
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and the like. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, predefined network health status rules may be manually designed for a network assurance system by administrator with a deep knowledge of real-world problems, operation of the monitored network, and remediation or mitigation strategies. However, such rules are often difficult to design and to maintain, as well as invariably covering only a fraction of the problematic situations. Further, implementation of health status rules is also very error prone. Most importantly, predefined health status rules are mere sketches of the underlying conditions, which are generally subtler and more varied than expected. For instance, a given AP may provide a better service to fifty clients than another AP does to just ten clients. The reason is that many other parameters such as radio frequency (RF) stats, location, and the health of the rest of the network infrastructure should also be taken into account when evaluating the quality of service. Additionally, the proper number of clients supported by an AP may vary according to the nature of these devices, the amount of traffic, the type of radio, and the like. Thus, predefined rules cannot account for such a large complexity.

On the other hand, purely machine learning driven approaches such as Anomaly Detection (AD) using unsupervised learning are prone to generating a large amount of false positives, which can advantageously be mitigated thanks to Reinforcement Learning (RL). Still, such an approach is prone to undesirable false positives and usually requires a substantial amount of data to converge. It is also worth noting that such anomalies may sometimes be difficult to interpret, in contrast with a purely rule-based approach where the conditions under which the rule "fired" are very well-known, making the interpretation quite straightforward.

Mixing Rule-Based and Machine Learning-Based Indicators in Network Assurance Systems The techniques herein allow for a network assurance system to mix both rule-based and machine learning-based approaches. Using this hybrid approach, the system retains the interpretability and actionability of rules, while allowing for more flexibility and expressiveness. In some aspects, predefined rules are mixed with a statistical classifier, to dynamically adapt the indicators provided by the network assurance system (e.g., to a user interface and/or an automated controller). For example, the rules may be used to initially train a statistical classifier, which is then adjusted dynamically, to reduce the number of false alerts, better fit objective measures of the quality of service, and adapt to the user feedback.

Specifically, according to one or more embodiments of the disclosure as described in detail below, a device in a network receives data regarding a plurality of predefined health status rules that evaluate one or more observed conditions of the network. The device, using the data regarding the plurality of health status rules for the network, trains a machine learning-based classifier to generate predictions regarding outputs of the health status rules. The device adjusts the machine learning-based classifier based on feedback associated with the generated predictions. The device provides an indication of one or more of the predictions regarding the outputs of the health status rules to a user interface.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
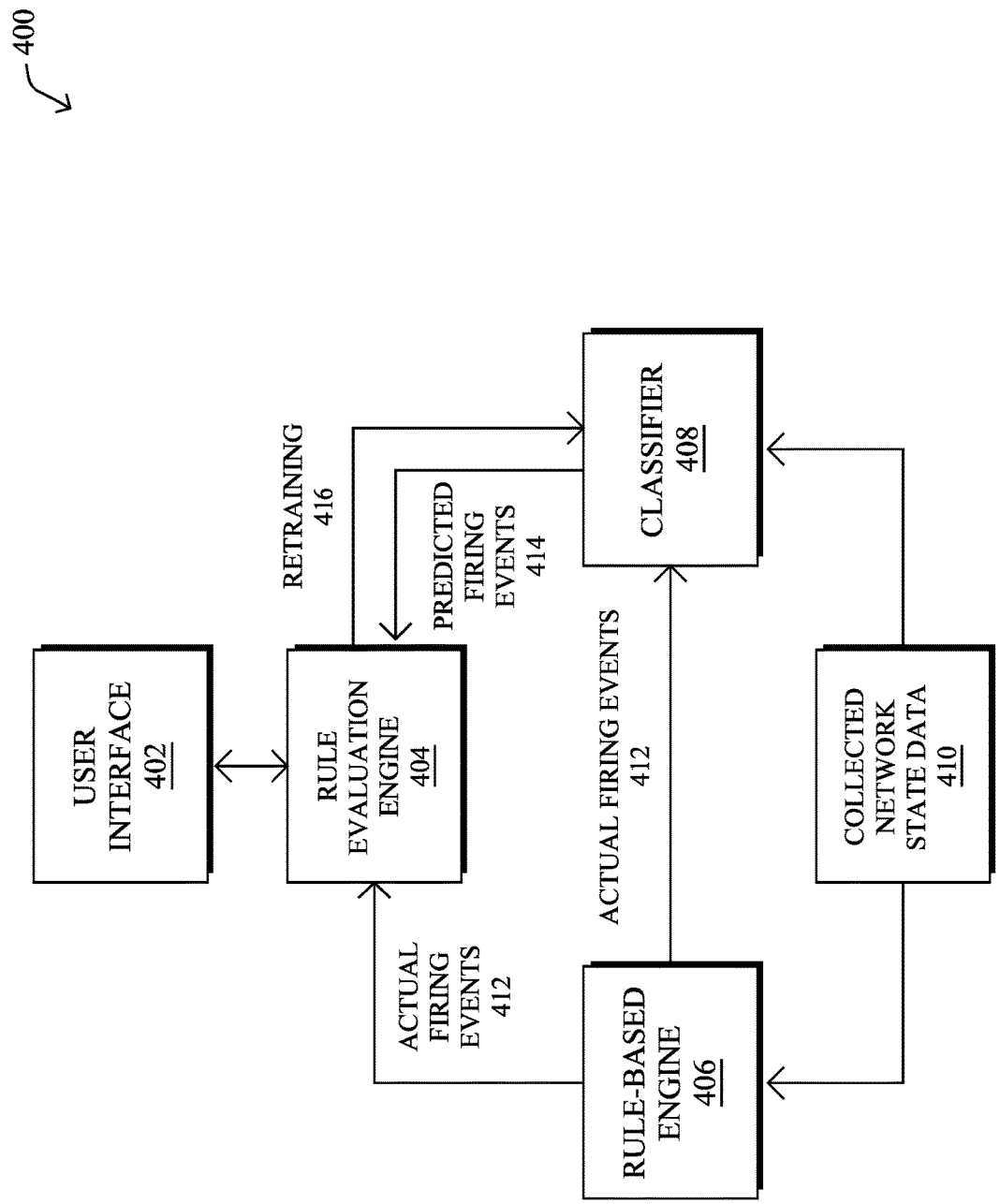
FIG. 4 illustrates an example architecture for mixing rule-based and machine learning-based indicators in a network assurance system.

Operationally, FIG. 4 illustrates an example architecture 400 for mixing rule-based and machine learning-based indicators in a network assurance system, according to various embodiments. As shown, architecture 400 may include a rule-based engine 406 that evaluates any number of predefined health status rules that evaluate one or more observed conditions of the network, as captured in collected network state data 410. For example, a simple health status rule may evaluate whether the bandwidth usage by a particular AP exceeds a predefined threshold.

In various embodiments, architecture 400 may also include a machine learning-based classifier 408 that is trained to predict, for a given state of the network (e.g., as indicated by network state data 410), whether a given $R_j$, of rule-based engine 406 will be evaluated positively or negatively. For example, continuing the example above, classifier 408 may predict whether rule-based engine 406 will determine that the bandwidth usage rule for the AP has been violated and the bandwidth exceeds the defined threshold.

For a set of health status rules $\{R_1, \ldots, R_N\}$, classifier 408 may predict N+1 outcomes: one per rule and no firing at all. Classifier 408 may be trained by observing the network assurance system and monitoring the firing of each rule by rule-based engine 412. Notably, as shown, classifier 408 may receive data 412 indicative of actual firing events for the rules maintained by rule-based engine 406 (e.g., the outcome of the rule evaluation and the corresponding network state data 410). As the training progresses, the accuracy of classifier 408 becomes such that the rules of rule-based engine can essentially be ignored by the network assurance system.

In various embodiments, the machine learning engine hosting classifier 408 may leverage a custom application program interface (API) to receive notifications about changes to the rules of rule-based engine 406, dynamically. For example, classifier 408 may receive API notifications from controller(s) in the network about newly added health status rules, removed rules, or adjusted rules, this making the training of classifier 408 automatic with the corresponding labels (e.g., the outputs of the evaluated rules). In some cases, the number of hits per rule can also be taken into account when training classifier 408, to prevent biases across the different rules.

Architecture 400 may also include a rule evaluation engine 404 that causes classifier 408 to adapt its predictions based on different criteria than the health status rules themselves. For example, rule evaluation engine 404 may receive data 412 regarding the actual rule firing events (e.g., when a given rule's conditions are met), data 414 regarding predicted firing events from classifier 408, and/or input from user interface 402. In turn, rule evaluation engine 404 may determine whether classifier 408 should be adjusted and, if so, send a retraining instruction 416 to classifier 408 to do so.

In various embodiments, rule evaluation engine 404 may consider any of three different types of criteria to adjust classifier 408: (1) the rate at which the rules fire, (2) an objective measures of the quality of service in the network, and/or (3) feedback of the user via user interface 402.

In the first case, if a rule of rule-based engine 406 fires too often or too seldom, rule evaluation engine 404 may adjust classifier 408 to reduce or increase this rate in the corresponding predictions from classifier 408. For example, rule evaluation engine 404 may select a different point on the Receiver Operating Characteristic (ROC) curve for classifier 408, thus adjusting the tradeoff between the true and false positive rates. The fundamental idea behind this mechanism is that unhealthy conditions should be uncommon, but not completely inexistent. When performed based on a large number of networks, this mechanism will yield rules that are more representative of real problems while retaining the initial meaning.

In the second case, rule evaluation engine 404 may rely on objective measures of the quality of service (QoS), or another such objective function, to determine whether classifier 408 should be adjusted. Example objective QoS metrics may include, but are not limited to, throughput, delay, jitter, user ratings in specific applications, combinations thereof, or the like. In general, the QoS metrics may differ from the actual network conditions evaluated by the rule(s) of rule-based engine 406. For example, consider the case in which an endpoint node is participating in a videoconference. One potential rule evaluated by engine 404 may assess whether the current load associated with the network path or devices involve is above a predefined threshold. Outside of the actual parameters evaluated by the rule may be an associated QoS metric either predicted or defined directly (e.g., the user participating in the videoconference may rate the QoS on a scale from 1-5 stars).

In some embodiments, if a poor QoS is observed for a network state that is not captured by any rule, rule evaluation engine 404 may cause classifier 408 to be retrained for this network state as a positive example of the "closest" rule (e.g., the one with the highest score for this condition). This essentially causes the rule to "expand" its scope, in order to capture new instances that were not envisioned by the original designer of the rule.

In another embodiment, if no existing rule is close enough to the condition associated with the QoS metric (e.g., given a cutoff score), a new class can be added to classifier 408 that captures this new condition. This new class can then be analyzed by an expert via user interface 402, in order to create the corresponding rule in rule-based engine 406. In other cases, rule evaluation engine 404 may dynamically create the rule automatically, based on the given conditions in the network associated with the QoS metric.

Conversely, if rule evaluation engine 404 determines that the QoS metric is not impacted by a given rule, should QoS be the objective function for the rule, engine 404 may train classifier 408 with a negative example for this rule. For instance, a large number of clients connected to an AP (e.g., beyond the predefined threshold of the rule) may not be a problem when the AP uses a specific standard supported by a given version of the firmware. Considering all combinations of thresholds, standards and firmware versions is very difficult using manual rules, but could be handled using a machine learning process, such as classifier 408.

In yet another embodiment, a custom message could optionally be sent to user interface 402, to validate or invalidate the assumptions made by the system (e.g., that classifier 408 can be trained with a negative example). Such observation of network states to influence training makes architecture 400 much more powerful than a system that uses only static rules.

In the third case, the user may of user interface 402 may provide feedback to rule evaluation engine 404 about the rule itself, ranging from binary feedback (e.g., like/dislike, relevant/not relevant, etc.) to more complex and structured feedback (e.g., natural language, edit proposals, etc.). In this case, rule evaluation engine 404 may use this feedback to retrain classifier 408 with positive or negative examples, and/or adjust the weight of these samples, and thus implicitly "remove" incorrect rules (e.g., based on negative feedback from the user, thus reducing false positive for that rule) or give more weight to the rule.

Figure 5:
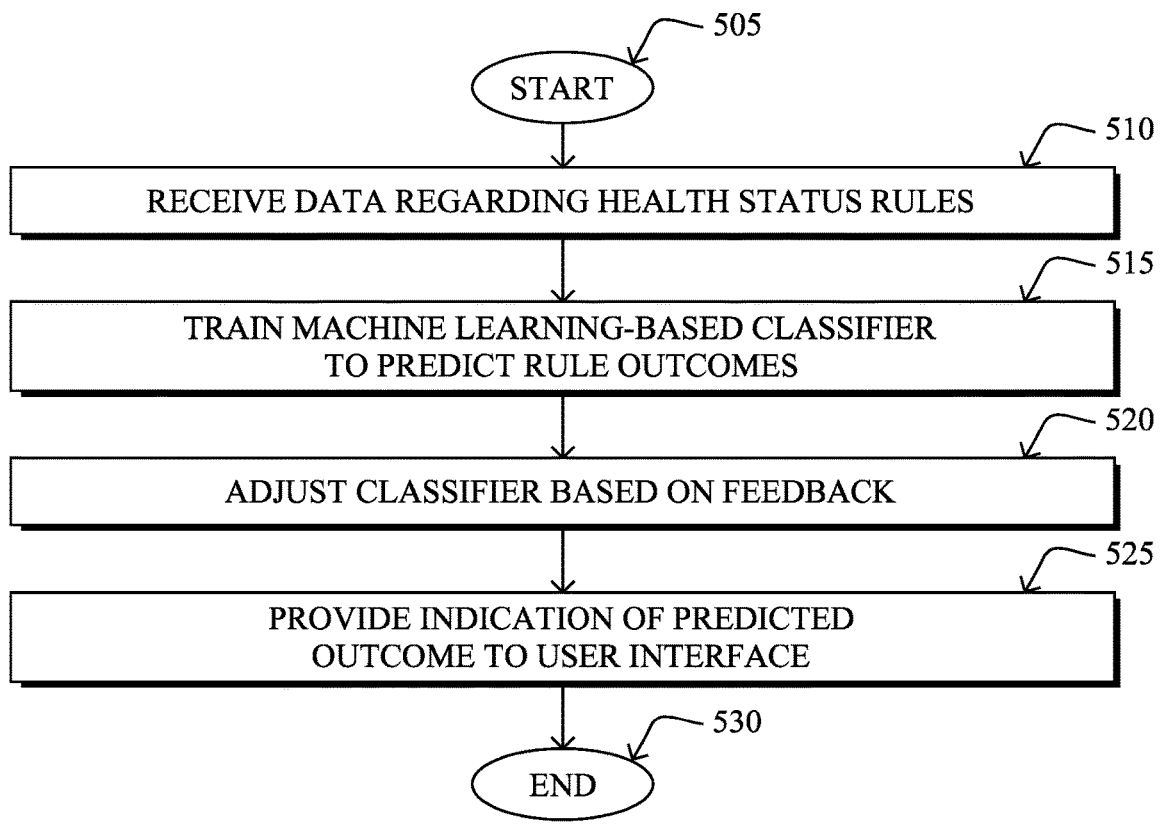
FIG. 5 illustrates an example simplified procedure for mixing rule-based and machine learning-based indicators in a network assurance system.

FIG. 5 illustrates an example simplified procedure for mixing rule-based and machine learning-based indicators in a network assurance system, in accordance with one or more embodiments described herein. For example, a non-generic, specifically configured device (e.g., device 200) may perform procedure 500 by executing stored instructions (e.g., process 248). The procedure 400 may start at step 505, and continues to step 510, where, as described in greater detail above, the device may receive data regarding a plurality of predefined health status rules that evaluate one or more observed conditions of the network. For example, such rules may compare one or more observed network metrics to one or more thresholds for those metrics. In further cases, a rule may evaluate a metric or computed statistic to a history or trend of the metric or statistic (e.g., if the peak usage for the current day exceeds the average peak for the past five days, etc.).

At step 515, as detailed above, the device may train a machine learning-based classifier to generate predictions regarding outputs of the health status rules. For example, using the data regarding the plurality of health status rules for the network (and potentially the observed metrics that trigger or did not trigger the rules), the device may train a classifier to predict whether or not a set of network observations are predicted to trigger a given one of the rules.

At step 520, the device may adjust the machine learning-based classifier based on feedback associated with the generated predictions, as described in greater detail above. In some cases, the feedback may be from a user interface, such as feedback from a user indicating that the user likes or dislikes a particular triggered rule, etc. In further cases, the feedback may be related to the rate at which the different rules are triggered. For example, if a given rule often fires, the device may adjust the classifier so as to lower the rate at which the predictions for the rule indicate that the rule is expected to be triggered. In other cases, the feedback may comprise a QoS metric for at least a portion of the network (e.g., a particular networking device, path, etc.). For example, if the rule was not triggered, but the objective QoS metric indicates poor quality, the device may retrain the classifier using training data associated with the closest rule or, if no existing rule is close enough, the device may add a new classification to the classifier. In another example, if the rule was triggered, but the QoS metric indicates acceptable quality, the device may train the classifier using a negative example (e.g., to suppress the firing of the rule).

At step 525, as detailed above, the device may provide an indication of the predicted outcome from the classifier to a user interface. For example, if the classifier predicts that a given health status rule will fire in view of the observed network characteristics, the device may provide a notification, warning, insight, etc. to the user interface, to alert a network administrator. For example, if the device determines that a given endpoint will experience a high amount of packet loss during a videoconference when attached to a given AP, the device may notify an administrator to this potential condition and/or make mitigation recommendations. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a network assurance system to retain the interpretability and actionability of defined rules, while also leveraging the flexibility and expressiveness of machine learning-based approaches.

While there have been shown and described illustrative embodiments that provide for mixing rule-based and machine learning-based indicators in network assurance systems, it is to be understood that various other adaptations and modifications may be made within the spirit and scope of the embodiments herein. For example, while certain embodiments are described herein with respect to using certain models for purposes of making predictions, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, data regarding a plurality of predefined health status rules that evaluate one or more observed conditions of the network;

training, by the device and using the data regarding the plurality of health status rules for the network, a machine learning-based classifier to generate predictions regarding outputs of the health status rules;

adjusting, by the device, the machine learning-based classifier based on feedback associated with the generated predictions, wherein the feedback associated with the generated predictions comprises a quality of service metric for at least a portion of the network; and providing, by the device, an indication of one or more of the predictions regarding the outputs of the health status rules to a user interface, wherein adjusting the machine learning-based classifier based on feedback associated with the generated predictions comprises:

determining, by the device, that none of the health status rules reflect the quality of service metric;

identifying, by the device, a particular one of the health status rules as most related to the quality of service metric based on an output from the particular health status rule; and retraining, by the device, the machine learning-based classifier using a positive example of the particular health status rule that is most related to the quality of service metric.

2. The method as in claim 1, further comprising:

receiving, at the device, an indication of a newly defined health status rule; and adjusting, by the device, the machine learning-based classifier to generate predicted outputs of the newly defined health status rule.

3. The method as in claim 1, wherein the feedback associated with the generated predictions comprises feedback information received from the user interface regarding a particular one of the health status rules.

4. The method as in claim 1, wherein the feedback associated with the generated predictions comprises a rate or count of times one of the health status rules was triggered by the one or more observed conditions of the network.

5. A method comprising:

receiving, at a device in a network, data regarding a plurality of predefined health status rules that evaluate one or more observed conditions of the network;

training, by the device and using the data regarding the plurality of health status rules for the network, a machine learning-based classifier to generate predictions regarding outputs of the health status rules;

adjusting, by the device, the machine learning-based classifier based on feedback associated with the generated predictions, wherein the feedback associated with the generated predictions comprises a quality of service metric for at least a portion of the network; and providing, by the device, an indication of one or more of the predictions regarding the outputs of the health status rules to a user interface, wherein adjusting the machine learning-based classifier based on feedback associated with the generated predictions comprises:

determining, by the device, that none of the health status rules reflect the quality of service metric;

determining, by the device, that none of the health status rules are related to the quality of service metric based on the outputs of the particular health status rules; and retraining, by the device, the machine learning-based classifier to add a new classification regarding the quality of service metric.

* * * * *